US007010619B2

(12) United States Patent
Vowe

(10) Patent No.: US 7,010,619 B2
(45) Date of Patent: Mar. 7, 2006

(54) CAN MODULE WITH JOINTLY UTILIZED COMPONENTS FOR CONNECTING TO MULTIPLE CAN BUSES

(75) Inventor: Achim Vowe, München (DE)

(73) Assignee: Infineon Technologies AG, Munich (DE)

(*) Notice: Subject to any disclaimer, the term of this patent is extended or adjusted under 35 U.S.C. 154(b) by 757 days.

(21) Appl. No.: 09/757,327

(22) Filed: Jan. 9, 2001

(65) Prior Publication Data
US 2002/0002644 A1 Jan. 3, 2002

Related U.S. Application Data

(63) Continuation of application No. PCT/DE99/02104, filed on Jul. 8, 1999.

(30) Foreign Application Priority Data
Jul. 9, 1998 (DE) ................................ 198 30 803

(51) Int. Cl.
*G06F 15/16* (2006.01)
(52) U.S. Cl. ........................ 709/250; 703/23; 370/463; 340/825
(58) Field of Classification Search ................ 709/250; 703/23; 375/219; 370/463; 340/825
See application file for complete search history.

(56) References Cited

U.S. PATENT DOCUMENTS

| 5,502,818 | A | * | 3/1996 | Lamberg ..................... 709/225 |
| 5,574,848 | A | | 11/1996 | Thomson |
| 5,600,782 | A | * | 2/1997 | Thomson ........................ 714/4 |
| 5,612,958 | A | | 3/1997 | Sannino |
| 5,726,541 | A | * | 3/1998 | Glenn et al. ................... 318/16 |
| 5,946,471 | A | * | 8/1999 | Voorhees et al. ............. 703/23 |
| 6,111,888 | A | * | 8/2000 | Green et al. ................. 370/461 |
| 6,216,172 | B1 | * | 4/2001 | Kolblin et al. .............. 709/253 |

FOREIGN PATENT DOCUMENTS

| DE | 19526800 A1 | * | 1/1997 |
| DE | 297 02 480 U1 | | 8/1998 |
| DE | 19758032 A1 | * | 7/1999 |

OTHER PUBLICATIONS

Siemens AG: "C167 Derivatives, 16-Bit CMOS Single-Chip Microcontrollers", *User's Manual 03.96 Version 2.0*, pp. 23-1 to 23-23-20, order No. B158-H6651-G1-X-7600.
H. Ekiz et al.: "Performance Analysis of a CAN/CAN Bridge", *1996 IEEE*, pp. 181-188, XP-002104040.

* cited by examiner

*Primary Examiner*—Kim Huynh
*Assistant Examiner*—Angel L Casiano
(74) *Attorney, Agent, or Firm*—Laurence A. Greenberg; Werner H. Stemer; Ralph E. Locher

(57) ABSTRACT

A CAN module contains several sets of storage elements for storing several sets of data representing different states of components of the CAN module. For example, a single bit stream processor component, one of the largest and most complicated constituents of the CAN module, can be used for a plurality of CAN buses when data representations of the different states of the bit stream processor are stored in the sets of storage elements. The CAN module can be used as a shared CAN module for several CAN buses and/or CAN nodes.

14 Claims, 1 Drawing Sheet

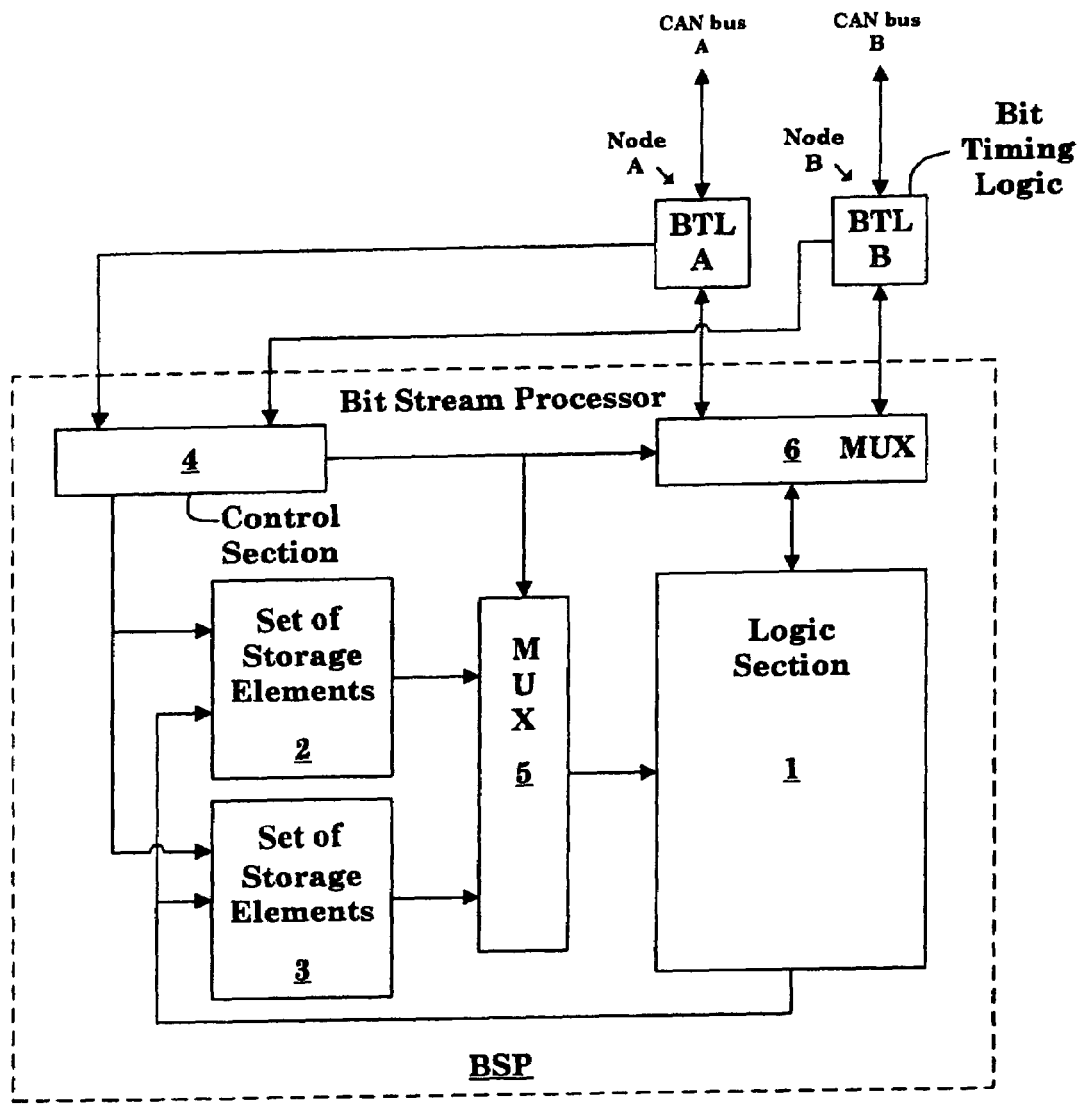

US 7,010,619 B2

CAN MODULE WITH JOINTLY UTILIZED COMPONENTS FOR CONNECTING TO MULTIPLE CAN BUSES

CROSS-REFERENCE TO RELATED APPLICATION

This is a continuation of copending International Application PCT/DE99/02104, filed Jul. 8, 1999, which designated the United States.

BACKGROUND OF THE INVENTION

Field of the Invention

The present invention relates to a controller area network (CAN) module.

CAN modules, as indicated by the designation itself, are required in so-called controller area networks. With the aid of CANs, control devices such as microcontrollers, for example, can be connected to or networked with other control devices, actuators, sensors, etc. A CAN bus connecting the individual components may contain a single line; data can be exchanged via the CAN bus between the components connected thereto, it being possible for the data exchange to be carried out very reliably and efficiently.

The CAN modules are generally constituents of the components which can be networked via the CAN bus, and regulate the data traffic effected via the CAN bus.

One possible practical configuration of a CAN module is described for example in the book published by Siemens AG and entitled "C167 Derivatives, 16-Bit CMOS Single-Chip Microcontrollers, User's Manual 03.96, Version 2.0" (order No. B158-H6651-G1-X-7600) on pages 23-1 to 23-20.

CANs are becoming more and more widespread, and, moreover, more and more microcontrollers are being equipped with CAN modules as standard. For certain applications, it may even prove to be favorable if a unit that is to be networked can be connected to other components via a plurality of CAN buses. In this case, a plurality of CAN modules are simply provided in the relevant component.

Although technically the provision of a plurality of CAN modules in a unit to be networked can readily be realized, it is relatively costly owing to the relatively complicated configuration of the CAN modules. Moreover, a great deal of chip area is required when accommodating the CAN modules in an integrated circuit.

This is a disadvantage and, understandably, it would be extremely desirable to eliminate it.

SUMMARY OF THE INVENTION

It is accordingly an object of the invention to provide a CAN module that overcomes the above-mentioned disadvantages of the prior art devices of this general type. The present invention is based on the object, therefore, of finding a possible way of enabling a component that is to be networked via a CAN to be connected to a plurality of CAN buses simultaneously with minimal outlay.

With the foregoing and other objects in view there is provided, in accordance with the invention, a controller area network (CAN) module containing a plurality of sets of storage elements for storing a plurality of sets of data representing different states of the CAN module.

Accordingly, a plurality of sets of storage elements for storing a plurality of sets of data representing different states of the CAN module are provided in the CAN module.

As a result, at least those parts of the CAN module which are subject to little capacity utilization, such as, by way of example, that part (the so-called bit stream processor (BSP)) of the CAN module which is responsible for adherence to the CAN protocol, can be utilized as a shared component for a plurality of CAN buses. Such shared utilization of at least parts of the CAN module enables the outlay that has to be expended in order to connect a component that is to be networked to a plurality of CAN buses to be reduced to a minimum.

In accordance with an added feature of the invention, there is provided a first CAN node, a second CAN node, and components whose state is represented by the sets of data stored in the sets of storage elements and are jointly utilized components that can be connected alternately to one of the first CAN node and to the second CAN node.

In accordance with an additional feature of the invention, the jointly utilized components are normally components whose capacity utilization is low.

In accordance with another feature of the invention, the jointly utilized components include a component which ensures that a CAN protocol is adhered to.

In accordance with a further feature of the invention, the sets of storage elements contain a first storage element set and a second storage element set. And including a first multiplexer through which the components whose state is represented by the sets of data stored in the sets of storage elements can be connected to one of the first storage element set and the second storage element set.

In accordance with a another added feature of the invention, a second multiplexer is connected to the first CAN node and the second CAN node, and through the second multiplexer, the jointly utilized components can be connected to one of the first CAN node and to the second CAN node.

In accordance with another mode of the invention, the jointly utilized components whose state is represented by the sets of data stored in the sets of storage elements are connected to the first storage element set through the first multiplexer. And the jointly utilized components are connected to the first CAN node via the second multiplexer, if, on a part of the first CAN node, a request to access the jointly utilized components is present.

In accordance with an added mode of the invention, the jointly utilized components whose state is represented by the sets of data stored in the sets of storage elements are connected to the second storage element set through the first multiplexer. And the jointly utilized components of the CAN module are connected to the second CAN node through the second multiplexer, if, on a part of the second CAN node, a request to access the jointly utilized components of the CAN module is present.

In accordance with a concomitant feature of the invention, possible reactions of the jointly utilized components to requests on the part of the first CAN node and the second CAN node are determined in advance and buffer-stored until a relevant request occurs.

Other features which are considered as characteristic for the invention are set forth in the appended claims.

Although the invention is illustrated and described herein as embodied in a CAN module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a block diagram, showing a configuration of a CAN module according to the invention.

DESCRIPTION OF THE PREFERRED EMBODIMENTS

A controller area network (CAN) module, described in more detail below, is part of a microcontroller which can be networked with other control devices (for example microcontrollers, too), actuators or sensors via a plurality of CAN buses (CAN nodes). It is distinguished by the fact that it has a plurality of sets of storage elements for storing a plurality of sets of data representing different states of the CAN module.

This makes it possible for the CAN module or parts thereof to be switched back and forth between different states, which in turn opens up the possibility of using the CAN module or parts thereof alternately for operating with a plurality of CAN buses.

The states represented by the data sets which can be stored in the plurality of sets of storage elements are, in particular, the states of components of the CAN module which have low capacity utilization. In the example considered in the present case, data representing different states of the so-called bit stream processor are stored in the plurality of sets of storage elements. As a result, the relevant bit stream processor can be used for a plurality of CAN buses. This proves to be particularly advantageous because the bit stream processor is one of the largest and most complicated constituents of the CAN module and the fact that it can be used for a plurality of CAN buses makes it possible to achieve a particularly pronounced saving of chip area.

It shall already be pointed out at this early stage that there is no restriction to the effect of only using the bit stream processor in the above-described manner for a plurality of CAN nodes. In principle, the procedure as described can additionally or alternatively be effected with other components of the CAN module as well.

The above-mentioned bit stream processor is part of the so-called protocol machine of the CAN module. The protocol machine forms, as it were, the interface between the CAN module and the CAN bus; as indicated by the term itself, it regulates the data traffic via the CAN bus taking account of the CAN specification.

The protocol machine of the CAN module also contains a so-called bit timing logic (BTL) in addition to the bit stream processor (BSP).

The BTL unit is connected directly to the CAN bus. It is responsible, in particular, for producing synchronization with the data stream (bit stream) transmitted via the CAN bus and for ensuring the reception and sending of data via the CAN bus.

The BSP unit (connected upstream of the BTL unit) reacts to the data received by the BTL unit and initiates as required the sending of data that are to be sent by the BTL unit. In addition, it ensures (in particular by corresponding driving of the BTL unit) adherence to the CAN protocol during the sending and receiving of data by the BTL unit.

As has already been mentioned above, the BSP unit is used as a shared BSP unit for a plurality of CAN buses. The way in which this can be realized in practice will now be described with reference to the FIGURE. In the illustration in the FIGURE and the description referring thereto, it is assumed that two CAN buses, namely a first CAN bus A and a second CAN bus B are operated by the BSP unit BSP. However, it shall already be pointed out at this early stage that there is no restriction to the number two. On account of its low capacity utilization, the BSP unit BSP can also be used as a shared component for more than two CAN buses.

Primarily on account of the synchronization which it has to carry out, the BTL unit is usually subject to high capacity utilization and, therefore, cannot normally be used, or at any rate not with a tenable outlay, as a shared BTL unit for the plurality of CAN buses. Therefore, in the example considered, a dedicated BTL unit is provided for each CAN bus, the BTL unit assigned to the first CAN bus A is designated by BTL A, and the BTL unit assigned to the second CAN bus B is designated by BTL B. Given a sufficiently high CPU clock frequency, however, it is also possible for a single BTL unit to be used jointly for the two or more CAN bus.

The (single) BSP unit BSP contains a logic section 1, a first set of storage elements 2, a second set of storage elements 3, a control section 4, a first multiplexer 5, and a second multiplexer 6.

The logic section 1 is the actual BSP unit. The way in which the system reacts to what events or states is defined in the logic section 1. The reaction of the logic section 1 depends, inter alia, on its own state. The data representing the state of the logic section 1 are stored in the two storage element sets 2, 3, the data stored in the first storage element set 2 representing that state of the logic section 1 which the latter has in its function as the BSP unit assigned to the first CAN bus A (i.e. node Node A) or to the first BTL unit BTL A, and the data stored in the second storage element set 3 representing that state of the logic section 1 which the latter has in its function as BSP unit assigned to the second CAN bus B (i.e. node Node B) or to the second BTL unit BTL B.

The logic section 1 operates in a manner taking account of the data stored in the first storage element set 2 if and as long as it is necessary to react to a request or action by the first CAN bus A or the first BTL unit BTL A. A the logic section 1 operates in a manner taking account of the data stored in the second storage element set 3 if and as long as it is necessary to react to a request or action by the second CAN bus B or the second BTL unit BTL B.

The data set that is taken into account by the logic section 1 when it is operating depends on the first multiplexer 5. Via the first multiplexer 5, the logic section 1 can be connected optionally to the first storage element set 2 or to the second storage element set 3 and can thereby be put alternately into the state that is to be assumed for operating the first CAN bus A or the first BTL unit BTL A and into the state that is to be assumed for operating the second CAN bus B or the second BTL unit BTL B.

The first multiplexer 5 is driven by the control section 4. The control section 4 is connected to the BTL units BTL A and BTL B and is informed by the latter when they require a connection to the BSP unit BSP. If the control section 4 receives a BSP request from the first BTL unit BTL A, then the control section 4 drives the first multiplexer 5 in such a way that the logic section 1 is connected to the first storage element set 2. If the control section 4 receives a BSP request from the second BTL unit BTL B, then the control section 4 drives the first multiplexer 5 in such a way that the logic section 1 is connected to the second storage element set 3.

The control section 4 also drives the second multiplexer 6. Via the second multiplexer 6, the logic section 1 can be connected optionally to the first BTL unit BTL A or to the second BTL unit BTL B and can thereby communicate alternately with the first BTL unit BTL A and the second BTL unit BTL B, that is to say alternately operate the first CAN bus A and the second CAN bus B.

In this case, the control section 4 drives the multiplexers 5, 6 in such a way that—generally speaking:
a) the components of the CAN module whose state is represented by the data stored in the storage element sets 2, 3 are connected to the first storage element set 2 via the first multiplexer 5, and
b) the jointly utilized components of the CAN module are connected to the first CAN bus A (node Node A) via the second multiplexer 6, if, on the part of the first CAN bus A, a request to the jointly utilized components of the CAN module is present, and that
c) the components of the CAN module whose state is represented by the data stored in the storage element sets 2, 3 are connected to the second storage element set 3 via the first multiplexer 5, and
d) the jointly utilized components of the CAN module are connected to the second CAN bus B (i.e. node Node B) via the second multiplexer 6, if, on the part of the second CAN bus B, a request to the jointly utilized components of the CAN module is present.

In the manner described, the BSP unit BSP can alternately operate two CAN buses (nodes). The use of a single BSP unit for a plurality of CAN buses (nodes) is non-critical because, as has already been mentioned above, the BSP unit BSP is subject only to relatively low capacity utilization.

In order to ensure that the BSP unit BSP can react as rapidly as possible to BSP requests on the part of the BTL units that are to be operated by it, it may be provided that the BSP unit BSP calculates, and buffer-stores, the possible reactions to events that are intended to provoke reaction actually in advance, i.e. before the occurrence of the relevant event. If the relevant event then occurs, reaction to it can be provoked simply by outputting or implementing the reaction calculated in advance.

This can be used in particular, but not exclusively, for the reaction of the BSP unit BSP to data received from the BTL units. The BTL units expect, at least partly within a predetermined time, a reply to data (data bits) which they have transmitted to the BSP unit, this reply depending on the state of the BSP unit and the value of the relevant data bit. If the advance calculation of the reply is carried out at a point in time at which that state of the BSP unit which is critical for the reaction thereof can no longer change before reception of the data bit to which it is necessary to react, then the reaction that is to be performed by the BSP unit depends "only" on the value of the data bit to which it is necessary to react. Since the value of a data bit can only be either 0 or 1, the possible replies can be determined completely in advance without any difficulty. The two possible replies (one for the case where the next data bit received has the value 0, and one for the case where the next data bit received has the value 1) are buffer-stored and output as required, i.e. when the relevant event occurs, which, understandably, is possible within a very short time and reliably precludes a belated reaction of the BSP unit.

The CAN module described can be used in the manner described without any difficulty, as a shared CAN module for a plurality of CAN nodes.

I claim:

1. A controller area network (CAN) module, comprising:
    a plurality of sets of storage elements for storing a plurality of sets of data representing different states of the CAN module;
    a first CAN node;
    a second CAN node;
    at least one jointly utilized component of the CAN module having a state represented by the sets of data stored in said sets of storage elements and configured to be connected alternately to one of said first CAN node and said second CAN node; and
    said sets of storage elements containing a first storage element set and a second storage element set, and including a first multiplexer through which said at least one jointly utilized component having a state represented by the sets of data stored in said sets of storage elements can be connected to one of said first storage element set and said second storage element set.

2. The CAN module according to claim 1, wherein said at least one jointly utilized component is normally a CAN module component having a capacity utilization below a capacity utilization threshold when said CAN module component is only connected to a single CAN bus.

3. The CAN module according to claim 1, wherein said at least one jointly utilized component includes a component which ensures that a CAN protocol is adhered to.

4. The CAN module according to claim 1, including a second multiplexer connected to said first CAN node and said second CAN node, and through said second multiplexer, said at least one jointly utilized component can be connected to one of said first CAN node and to said second CAN node.

5. The CAN module according to claim 4, wherein:
    said at least one jointly utilized component having a state represented by the sets of data stored in said sets of storage elements is connected to said first storage element set through said first multiplexer; and
    said at least one jointly utilized component is connected to said first CAN node via said second multiplexer, if, on a part of said first CAN node, a request to access said at least one jointly utilized component is present.

6. The CAN module according to claim 4, wherein:
    said at least one jointly utilized component having a state represented by the sets of data stored in said sets of storage elements is connected to said second storage element set through said first multiplexer; and
    said at least one jointly utilized component of the CAN module is connected to said second CAN node through said second multiplexer, if, on a part of said second CAN node, a request to access said at least one jointly utilized component of the CAN module is present.

7. The CAN module according to claim 1, wherein possible reactions of said at least one jointly utilized component to requests on the part of said first CAN node and said second CAN node are determined in advance and buffer-stored until a relevant request occurs.

8. A controller area network (CAN) module for a microcontroller, the CAN module comprising:
    storage elements for storing data representing different states of the CAN module;
    bit timing logic units, including a first bit timing logic unit and a second bit timing logic unit; and
    a logic unit connected between said bit timing logic units and said storage elements, a state of said logic unit is represented by the data stored in said storage elements and said logic unit is a jointly utilized component that can be connected alternately to one of said first bit timing logic unit and to said second bit timing logic unit.

9. The CAN module according to claim 8, wherein said logic unit has a component which ensures that a CAN protocol is adhered to.

10. The CAN module according to claim 8, wherein said storage elements contain a first storage element and a second storage element, and including a first multiplexer connected between said storage elements and said logic unit, said first multiplexer selectively connecting said logic unit to one of said storage elements.

11. The CAN module according to claim 10, including a second multiplexer connected between said bit timing logic units and said logic unit and selectively connecting the logic unit to one of said bit timing logic units.

12. The CAN module according to claim 11, wherein:
 said logic unit whose state is represented by the data stored in said storage elements is connected to said first storage element through said first multiplexer; and
 said logic unit is connected to said first bit timing logic unit through said second multiplexer, if, on a part of said first bit timing logic unit, a request for access to said logic unit is present.

13. The CAN module according to claim 11, wherein:
 said logic unit whose state is represented by the data stored in said storage elements is connected to said second storage element through said first multiplexer; and
 said logic unit is connected to said second bit timing logic unit through said second multiplexer, if, on a part of said second bit timing logic unit, a request to access logic unit is present.

14. The CAN module according to claim 8, wherein possible reactions of said logic unit to requests from said bit timing logic units are determined in advance and buffer-stored until a relevant request occurs.

* * * * *